K. SCHNETZLER.
REPULSION MOTOR GENERATOR.
APPLICATION FILED NOV. 3, 1910.
1,194,671.
Patented Aug. 15, 1916.
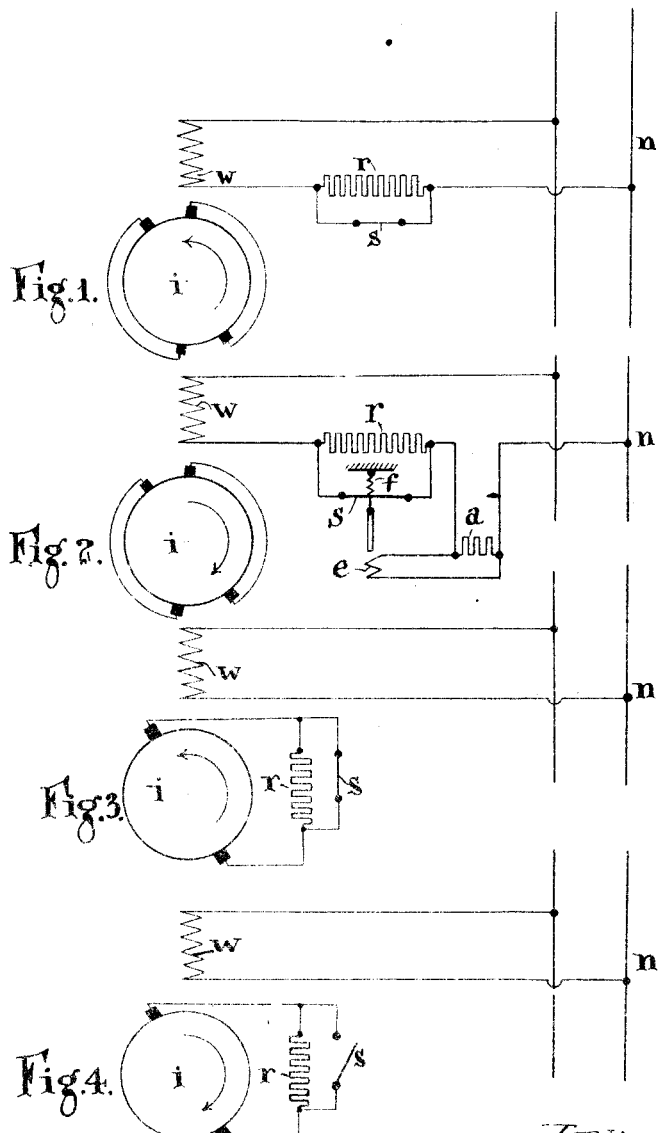

UNITED STATES PATENT OFFICE.

KARL SCHNETZLER, OF BADEN, SWITZERLAND, ASSIGNOR TO AKTIENGESELLSCHAFT BROWN BOVERI & CIE., OF BADEN, SWITZERLAND.

REPULSION-MOTOR GENERATOR.

1,194,671.

Specification of Letters Patent. Patented Aug. 15, 1916.

Application filed November 3, 1910. Serial No. 590,513.

*To all whom it may concern:*

Be it known that I, KARL SCHNETZLER, a subject of the German Emperor, and residing at Burghaldenstrasse 7, Baden, Switzerland, have invented certain new and useful Improvements in and Relating to Repulsion-Motor Generators, of which the following is a specification.

This invention relates to repulsion motors, more particularly when operating as generators.

If a repulsion motor be driven in a direction opposite to its torque it will act as a generator and restore energy to the line. When operating in this way, however, high currents of low periodicity are produced in the stator and rotor which are liable to damage the windings.

The object of the present invention is to enable a repulsion motor to operate as a generator without dangerous currents being produced.

The invention consists in increasing the effective resistance of the rotor circuit or circuits or of the stator or of both circuits to such an extent as to prevent the generation of dangerous currents of low periodicity, under the magnetic and electrical conditions prevailing.

The invention also consists in the improvements in and relating to repulsion motors herein indicated.

Referring to the accompanying diagrammatic drawings, Figure 1 shows a scheme of connections with a resistance for insertion in the stator circuit of a repulsion motor with two sets of brushes. Fig. 2 illustrates a conventional method of operating the short circuiting switch for the resistance to be inserted according to the present invention. Figs. 3 and 4 illustrate an arrangement with a resistance for insertion in the rotor circuit of a repulsion motor of ordinary form. Fig. 5 illustrates a conventional method of operating the short circuiting switch for the resistance to be inserted according to the present invention.

In the form of the invention illustrated by way of example in Fig. 1, the stator winding $w$ of a repulsion motor is connected to the system $n$ through a resistance $r$ which can be short-circuited by the switch $s$ and which is shown short circuited. The rotor $i$ of the repulsion motor has two sets of brushes, each set being connected as indicated in the diagram. With the resistance short-circuited, as illustrated in Fig. 1, the repulsion machine will operate in the ordinary manner as a motor rotating for example in the direction of the arrow. If the rotor, $i$, however, be rotated in the opposite direction by mechanical means as has been mentioned above a generator action will take place and the switch $s$ should be open thereby throwing the resistance $r$ into series with the stator winding $w$ and preventing the passage of high dangerous currents in the stator winding.

In the form of the invention shown in Fig. 3 a repulsion motor is indicated with a resistance $r$ connected across the brushes of the rotor $i$, a switch $s$ being provided for short circuiting this resistance when desired. Fig. 3 illustrates the arrangement when working as a motor, the resistance being short circuited, and Fig. 4 when working as a generator the switch $s$ being open and the resistance connected across the rotor brushes. It will be understood that resistances may be applied in both rotor and stator circuits if desired. Further, the additional resistance applied either in the rotor or stator circuits may be arranged within or outside the machine, and of course if the machine only be required to operate as a generator then the short circuiting switch need not be supplied.

If desired the resistance need only be put into circuit at high speeds when the risk of self-excitation is great and they may be thrown in automatically as soon as a self-excitation or dangerous current begins to flow and be cut out of circuit or short circuited when such current disappears or is sufficiently reduced.

In Fig. 2 is illustrated a conventional method of throwing the resistance into circuit on the occurrence of dangerous current. A switch blade $s$ is normally held by a spring $f$ in a position (as shown in Fig. 2) short circuiting the resistance 1 and thereby cutting it out of action. The blade $s$ is capable of being pulled off by the core of a solenoid $e$ possessing high inductance which is connected across the terminal of a further resistance $a$ of negligible inductance compared with $e$ connected in series with the resistance $r$. By this conventional arrangement it will be appreciated that during operation as a motor the current of net frequency passes almost exclusively through the resistance $a$ but on the occurrence of the dangerous generator currents of low frequency a comparatively large portion of the current can pass through and energize the solenoid $e$ thereby introducing the resistance $r$ into circuit by the removal of the short circuiting switch $s$.

It will be appreciated that the insertion of resistance lowers the efficiency of the generator but in most cases this is no great disadvantage especially for example in connection with lift working and in many cases the resistance may also be useful because the total braking energy must not be returned to the line.

Having now described my invention what I claim as new and desire to secure by Letters Patent is:—

1. In dynamo electric machinery in combination a repulsion generator including a stator and a rotor, windings on said stator and on said rotor, alternating current mains, electrical connections from said mains to said stator winding, a commutator in connection with the windings on said rotor, brushes therefor, an electrical connection between said brushes, means for supplying mechanical power to said rotor, a non-inductive resistance connected in circuit with at least one of said windings and a short circuiting switch for said resistance; as set forth.

2. In dynamo electrical machinery in combination a repulsion generator including a stator and a rotor, windings on said stator and on said rotor, alternating current mains, electrical connections from said mains to said stator winding, a commutator in connection with the windings on said rotor, brushes therefor, an electrical connection between said brushes, means for supplying mechanical power to said rotor, a non-inductive resistance connected in circuit with at least one of said windings and a short circuiting switch for said resistance, together with a device for automatically operating said switch; as set forth.

3. In dynamo electric machinery in combination a repulsion generator including a stator and a rotor, windings on said stator and on said rotor, alternating current mains, electrical connections from said mains to said stator winding, a commutator in connection with the windings on said rotor, brushes therefor, an electrical connection between said brushes, means for supplying mechanical power to said rotor, a non-inductive resistance connected in series with said stator winding and means for varying the effect of said resistance; as set forth.

4. In dynamo electric machinery in combination a repulsion generator including a stator and a rotor, windings on said stator and on said rotor, alternating current mains, electrical connections from said mains to said stator winding, a commutator in connection with the windings on said rotor, brushes therefor, an electrical connection between said brushes, means for supplying mechanism power to said rotor, windings on said stator and said rotor, a non-inductive resistance in series with one of said windings and a switch the terminals of which are connected to the terminals of said non-inductive resistance; as set forth.

5. In dynamo electric machinery in combination a repulsion generator including a stator and a rotor, windings on said stator and on said rotor, alternating current mains, electrical connections from said mains to said stator winding, a commutator in connection with the windings on said rotor, brushes therefor, a direct electrical connection between said brushes, means for supplying mechanical power to said rotor, a non-inductive resistance connected in circuit with at least one of said windings and a short circuiting switch for said resistance, together with a device for automatically operating said switch; as set forth.

In testimony whereof, I affix my signature in presence of two witnesses.

KARL SCHNETZLER. [L.S.]

Witnesses:
CARLO FASOLA,
MARIA FASOLA.